Figure 1:
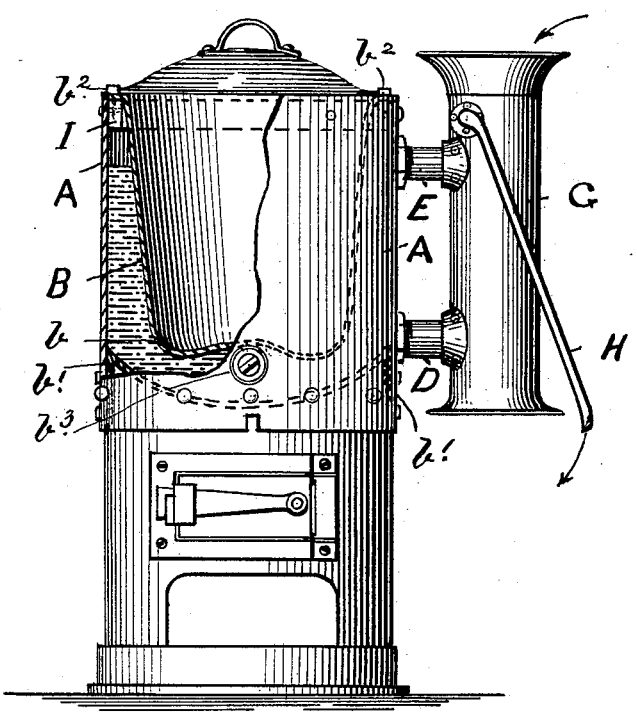

No. 615,741. Patented Dec. 13, 1898.
E. W. PARISH.
LOW PRESSURE STEAM APPARATUS FOR COOKING, &c.
(Application filed Feb. 7, 1898.)
(No Model.)

WITNESSES.
Marion Dutton
May Dutton.

INVENTOR.
Edward William Parish
per W. Sherwin Mansfield
Attorney

UNITED STATES PATENT OFFICE.

EDWARD WILLIAM PARISH, OF LEICESTER, ENGLAND.

LOW-PRESSURE STEAM APPARATUS FOR COOKING, &c.

SPECIFICATION forming part of Letters Patent No. 615,741, dated December 13, 1898.

Application filed February 7, 1898. Serial No. 669,409. (No model.)

*To all whom it may concern:*

Be it known that I, EDWARD WILLIAM PARISH, a subject of Her Britannic Majesty Queen Victoria, residing at Mona House, South Knighton, Leicester, in the county of Leicester, England, have invented certain new and useful improvements in low-pressure steam apparatus for cooking, steam-generating, water-heating, drying, evaporating, and similar purposes; and I do hereby declare the following to be a full, clear, and exact description of the invention, such as will enable others skilled in the art to which it appertains to make and use the same.

My invention relates to improvements in low-pressure steam apparatus for the purpose as above described and shown in the form of a jacketed pan with "geyser" attachment thereto.

According to my invention the apparatus consists of an outer cylinder or jacket A, made of stout iron of the desired dimensions. Into this outer cylinder is placed a food-containing pan B, having an indented or undulated bottom $b$, which increases the water-space between it and the bottom $b'$ of the outer pan. (Seen partly in section and partly in dotted line, Figure 1.) Said bottom is arched and comes immediately over the center of the furnace, which is of the ordinary character and specially arranged to receive the outer cylinder or jacket A, represented in the drawings accompanying this specification, in which—

Figure 2:
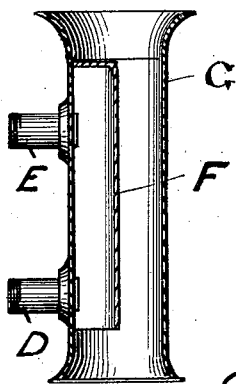

Fig. 1 is a side elevation, partly in section, of the complete apparatus; and Fig. 2, a side sectional elevation of the feed-cylinder or geyser attachment.

At a suitable distance from the bottom water-space in the outer pan A is introduced the cold-water-inlet pipe D, leading from the expansion-chamber F (see Fig. 2) of the feed-cylinder G. The upper or hot-water-outlet pipe E is filled at the required distance above, so that the heated water or steam passes therethrough and enters the upper part of the expansion-chamber above the water-line and escapes or is forced when required for serving out a constant supply of hot water or other liquid from the tube or pipe H in the direction of the arrow shown. This is accomplished by the attendant, after starting the furnace, supplying the feed-cylinder with cold water or other liquid into the mouth thereof, as indicated by the arrow shown, from any suitable source of supply.

It will be observed upon reference to Fig. 2 of the drawings that the wall of the expansion-chamber, mantle, or hood F does not reach the bottom of the feed-cylinder, a space being left; if it reached to the bottom perforations would have to be made at about the same point.

The supply of hot water or other liquid is not limited by the cooking operation which is going on in the inner pan B. When a temperature of 205° Fahrenheit has been reached, the surplus steam coming through the tube or pipe H can be conveyed to a steam chest or chamber of any suitable kind.

In the construction of the jacketed apparatus the annular ring I is bolted to the top edge of the outer pan and carries the flanged edge of the inner pan B, so allowing of said inner pan to be removed for cleaning purposes by removing the screws $b^2$, or the bottom of the outer riveted cylinder can be cleansed of any sediment that may congregate by the attendant removing the screw-plug $b^3$ and pouring water into the mouth of the feed-chamber or geyser G. The lid shown covering the inner pan is not necessary when the apparatus is required for evaporating liquids, grain, or the like.

The feed attachment or geyser G may be connected to any ordinary single or double boiling-pan or an auxiliary device, such as a bath, in providing the same with a continuous supply of hot water without interfering with the cooking or evaporating operation.

I am well aware that double cooking utensils having return-pipes for returning hot water to the boiler have been used, but the employment of a feed-chamber or geyser attachment not returnable to the boiler whereby a continuous supply of hot water or other liquid can be obtained by supplying the attachment with cold liquid without interfering with the operations conducted in the low-pressure apparatus is believed by me to be new, and

What I claim, and desire to secure by Letters Patent, is—

In an apparatus for cooking, and the like purposes, the combination of an outer receptacle A, adapted to rest upon a furnace, and provided with a cleaning screw-plug $b^3$, of an inner receptacle B adapted to rest upon the edge of the receptacle A, and a trumpet-mouthed feed-chamber secured to and communicating with the receptacle A by means of the pipes D and E, said feed-chamber having a hood or mantle covering the openings of the pipes D and E and extending to near the bottom of the chamber, and an outlet-pipe communicating with the space inclosed by the mantle or hood above the opening of the pipe E, substantially as described.

In witness whereof I have hereunto set my hand in presence of two witnesses.

EDWARD WILLIAM PARISH.

Witnesses:
MARION DUTTON,
MAY DUTTON.